Oct. 24, 1950

G. D. BRADSHAW 2,527,392

STEAM, GAS, AND AIR SEPARATOR

Filed Feb. 18, 1946

INVENTOR
Grant D. Bradshaw
by Christy, Parmelee & Strickland
his attorneys

Oct. 24, 1950     G. D. BRADSHAW     2,527,392
STEAM, GAS, AND AIR SEPARATOR
Filed Feb. 18, 1946     3 Sheets-Sheet 2
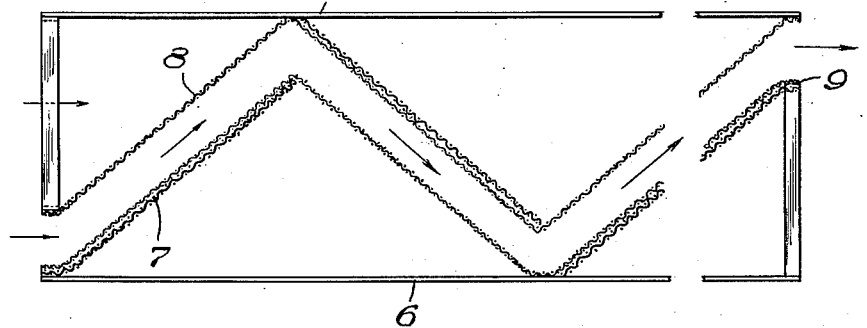
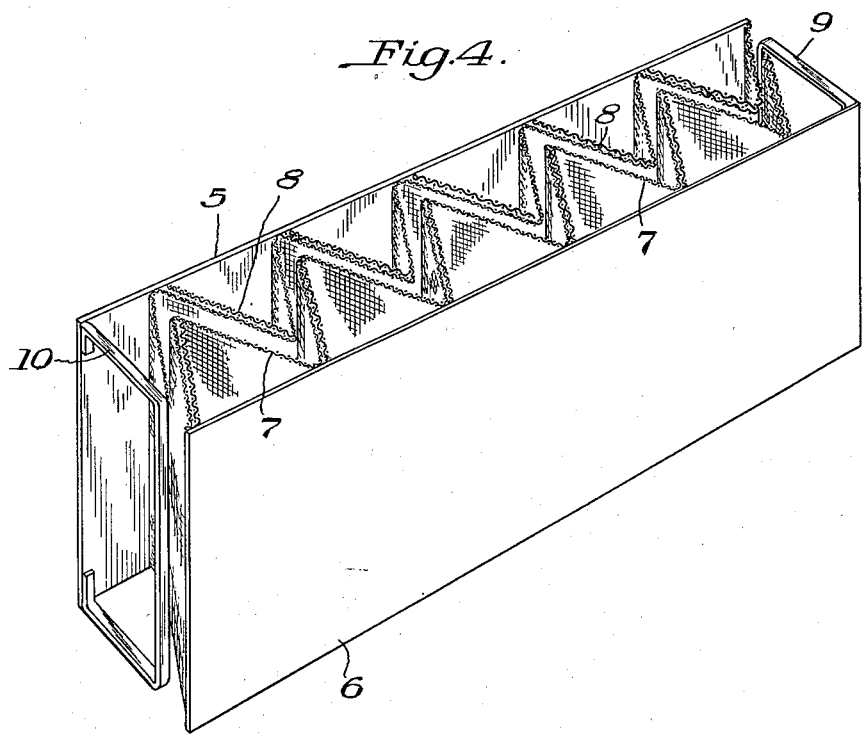
INVENTOR
Grant D. Bradshaw
by Christy, Parmelee & Strickland
his attorneys Oct. 24, 1950        G. D. BRADSHAW        2,527,392
STEAM, GAS, AND AIR SEPARATOR
Filed Feb. 18, 1946        3 Sheets-Sheet 3
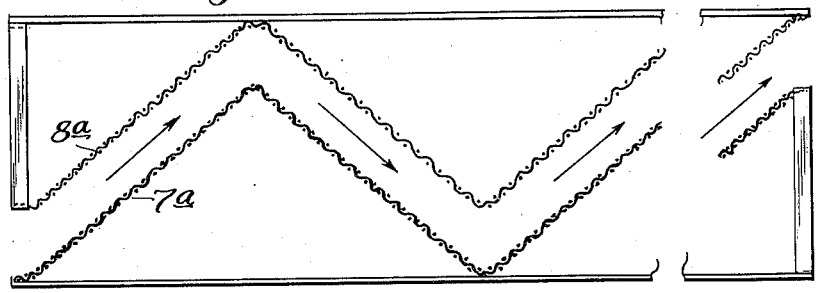
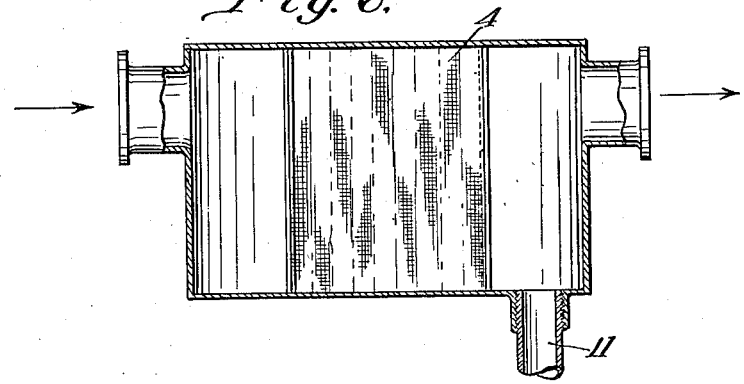
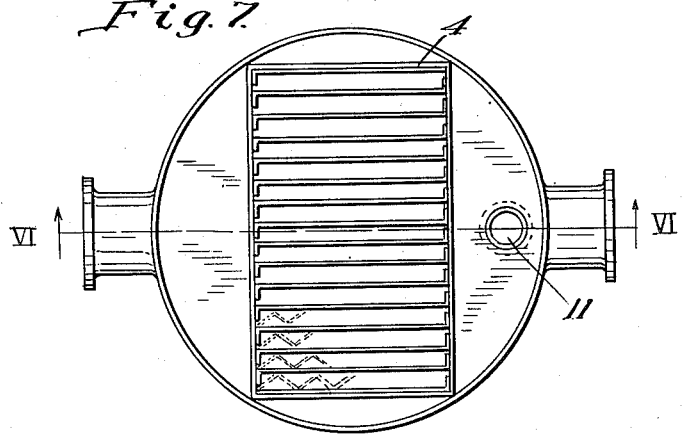
INVENTOR
Grant D. Bradshaw
by Christy, Parmelee & Strickland
his attorneys

Patented Oct. 24, 1950

2,527,392

UNITED STATES PATENT OFFICE 2,527,392

STEAM, GAS, AND AIR SEPARATOR

Grant D. Bradshaw, Beaver, Pa., assignor to Bradshaw & Company, Pittsburgh, Pa., a corporation of Pennsylvania Application February 18, 1946, Serial No. 648,253

6 Claims. (Cl. 183—71)

This invention relates to apparatus for separating and removing entrained liquid and solid impurities from gas, vapor or compressed air, and may be classified as a steam separator, gas and oil separator, or, more strictly speaking, an air or vapor purifier.

In steam boilers, solid impurities and entrained boiler water carried from the boiler in the steam generally are in sufficient amounts to cause operating difficulties and reduce plant efficiency. In boilers equipped with super heaters, deposits of oil and other impurities in the steam on the super heater tubes are quite harmful since they form insulating coatings and reduce the efficiency of heat transferred, cause erosion and in many other ways reduce efficiency of the unit. Where impure steam is used in processing, the quality of the product is lowered. It is therefore important that effective means should be used for filtering out or separating impurities, such as entrained oil, liquids and solids, from the steam. Apparatus generally referred to as separators separate out most of these impurities but the impingement of oil and other impurities on the flat or corrugated surfaces generally present in separators cause "spattering" which results in the creation of even finer particles which are picked up and carried by the vapor. Consequently, such separators do not completely remove the impurities but merely reduce them to small amounts.

In compressed air lines, condensation, oil and dirt are generally present and are also harmful in effect, hence should also be removed, such as by a separator.

In gas lines, oil, gasoline and dirt are generally present and likewise are harmful and should also be eliminated, such as by a separator.

An object of my invention, therefore, is to provide a separator, or, more strictly speaking, a purifier that will substantially eliminate oil, similar liquids or solids entrapped in steam, gas vapor or air.

A more specific object of my invention is to provide a primary separating device for separating out larger particles of impurities, such as oil or water, from steam by centrifugal action, together with a secondary purifying unit made up of screens for filtering out the minute remaining particles of oil, water, or other impurities, so as to ultimately produce highly purified dry steam, air or gas, useful for various purposes.

A further specific object of my invention is to provide a purifier embodying a novel baffle structure which will effectively filter out finely divided impurities, and at the same time not provide an obstruction to the flow of gases therethrough, and which is simple in construction and inexpensive to manufacture.

Other objects and advantages will become apparent from a study of the following specification, taken with the accompanying drawings, wherein:

Figure 3 is an enlarged top view of one of the baffle units shown in Figures 1 and 2;

Figure 4 is an enlarged perspective view of the baffle unit shown in Figure 3;

Figure 5 is a view similar to Figure 3 of a modified form of screen;

Figure 6 is a longitudinal cross-sectional view of a modified purifying unit devoid of a centrifugal separating container; and Figure 7 is a top view of the structure shown in Figure 6.

Figure 1:
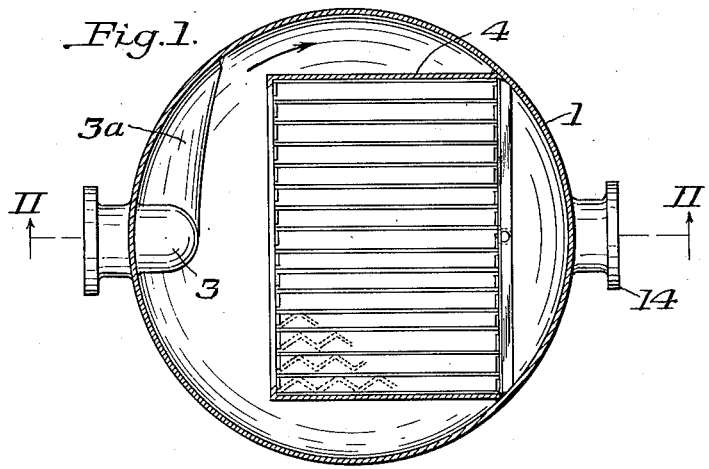
Figure 1 is a cross-sectional view of the separating or purifying unit taken along line I—I of Figure 2.
Figure 2:
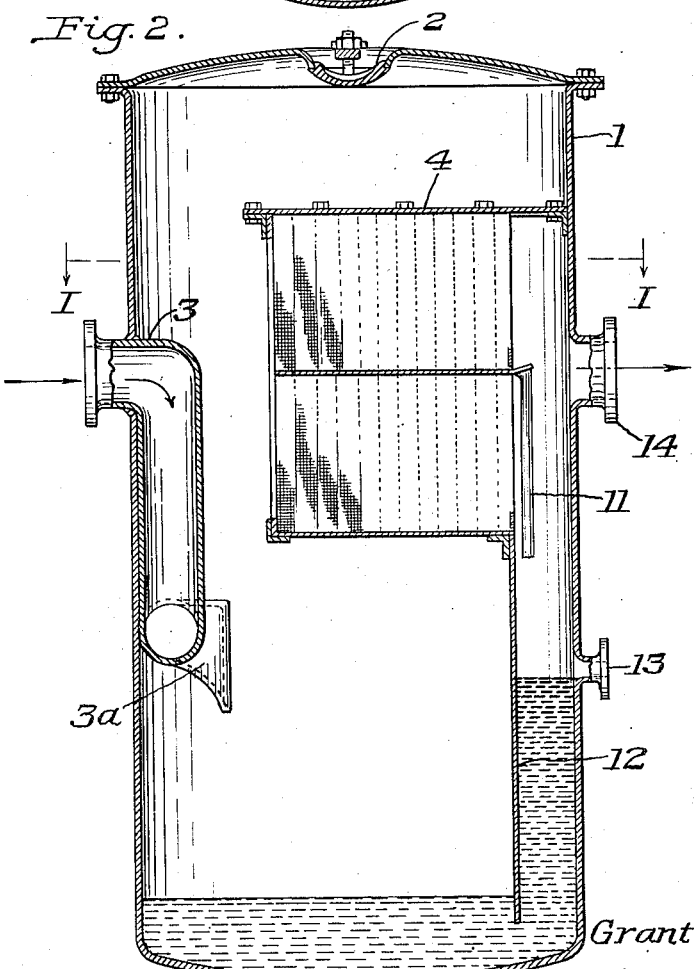
Figure 2 is a longitudinal cross-sectional view taken along line II—II of Figure 1.

Referring more particularly to Figures 1 and 2, numeral 1 denotes a vessel or container. A manhole 2 is provided at the top to facilitate entry, cleaning and repair of the container. Steam enters the container through a flanged opening of pipe 3, which pipe is bent downwardly at right angles and extends vertically along a wall of the container. The bottom portion of pipe 3 has a laterally extending portion 3a for deflecting the steam tangentially of the container. The centrifugal force operating at a point of decreasing velocity tends to throw out the heavier particles of impurities. The action of centrifugal force at a point where the velocity is decreasing is an important aspect of primary separation. This is because of the fact that velocity is transformed into static pressure. In other words, a building up of static pressure tends to throw out heavy particles and aids in the effect of centrifugal separation. The heavy particles fall and settle at the bottom of the container. The gases rise upwardly for further separation by a secondary separator or purifier.

Near the top of the container is mounted a box 4 enclosing a secondary separating or purifying chamber. Box 4 contains vertical screening baffle units arranged in a sinuous manner to form an unobstructed tortuous or sinuous path through which the steam may flow. A plurality of such units are arranged side by side, as will be readily apparent from Figures 1 and 2. One of the units is shown more clearly in Figures 3 and 4.

Referring more particularly to Figures 3 and 4, it will be seen that each baffle unit comprises a pair of parallel plates 5 and 6 between which are disposed a pair of spaced, zigzag shaped screens 7 and 8. One end of screen 7 is secured to plate 6 while the other end is secured to a supporting bracket member 9, whereas one end of screen 8 is connected to plate 5, while its other end is connected to a supporting bracket 10, the respective supporting brackets 9 and 10 being welded or otherwise secured to plates 6 and 5 respectively. It will be seen that the space between screens 7 and 8 forms a zigzag path for the substantially unobstructed flow of steam. It will also be observed that at the joint of entry of the steam, namely, from the left as viewed in Figure 3, the portion of screen 8 which confronts the steam is of single thickness, or at least substantially thinner than the subsequent leg portion of screen 8. This will allow the incoming steam to readily pass through this thin portion of screen 8 and to become substantially intercepted by the subsequent thicker portion of screen 8. It will also be noted that the entrance leg portion of screen 7 is likewise substantially thicker than the adjoining leg portion. In a similar manner, as the steam moves into the second leg of the zigzag path, the thicker portion of screen 8 forms a substantial obstruction, whereas the thinner portion of screen 7 forms a small obstruction to the flow of steam. This arrangement permits a wiping action of oil and other impurities against the netting or screen, and the deposit of such impurity particles thereon which will be held by surface tension. The particles will agglomerate and run down vertically to the drainage floor where they become large enough to overcome the surface tension. When they reach the floor, they will be carried around in the direction of flow and dropped down into the main body through drain pipes such as 11 into the main body of the separator behind the shield or baffle plate 12. The unobstructed zigzag paths between screens form unobstructed paths for the flow of steam to be purified.

This shield or baffle plate 12 separates the main body of the primary separator unit from the portion receiving drainage from the secondary separator unit. Baffle plate 12 is water sealed at the bottom, hence the water level to the left of it, as viewed in Figure 2, will be lower than the drainage level to the right by the amount equivalent to the resistance through the separating elements. Oil and other impurities may be drained from flanged outlet 13. After the steam passes through the secondary separating unit, it flows through a flanged outlet 14 into any part of the system where highly purified steam is desired.

An outstanding advantage in making the screening baffle units of the construction shown in Figures 3 and 4 is that both screens 7 and 8 are identical in construction, that is, they have alternate thin and thick legs, hence simplifying the design and reducing manufacturing costs. Furthermore, the mounting of screen 8 on plate 5 is symmetrical with respect to the mounting of screen 7 on plate 6 so as to further reduce costs, since the two separate screens and supporting structure are essentially identical in construction. Double layers may provide the thick portions of 7 and 8.

Figure 5 shows a modification of the screen unit of Figure 3, wherein a single thickness of screen is provided in legs 7a of double thickness, or substantially greater thickness than the thickness of screen legs 8a.

Figures 6 and 7 show a modification wherein the first stage of purification as found in the lower portion of container 1 in Figure 2 is eliminated, and wherein the screen unit 4 comprises the entire purifying system. These figures show that the first stage of purification may be eliminated in certain cases, or, in other words, is not indispensable in the purifier unit.

While the screens in unit 4 have been described as having alternate thick and thin leg portions, it should be noted that for some purposes the screen legs may be made of uniform thickness, instead, and still give satisfactory results, that is, till provide an alternate tortuous path between the screens for the free flow of air, gas or vapor.

Thus, it will be seen that I have provided an efficient separating and purifying unit for effectively removing even small traces of oil and other impurities from steam, gas or vapor, so as to cause high purification thereof to make it useful for a wide variety of purposes where high purity is essential. Furthermore, I have provided a simple and inexpensive secondary purifying unit which will effectively remove even very small particles of oil and water that remain after a primary separation, so as to produce highly purified dry steam.

While I have illustrated and described certain specific embodiments of my invention, it will be understood that this is by way of illustration only, and that various changes and modifications may be made within the contemplation of my invention and within the scope of the following claims.

I claim:

1. In a filtering unit, the combination comprising a pair of spaced parallel plates defining a passage-way therebetween through which a gas to be filtered may pass, at least one of said plates having a filtering screen of wave-like configuration mounted thereon to provide a plurality of screening surfaces through which a gas to be cleaned of entrained liquid may pass in its movement through said passage-way, said screen being spaced from the other of said plates to provide a path in said passage-way unobstructed by said screen through which the gas may move in the event of cloggage of the screen forming said filtering surfaces by liquid removed from the gas.

2. In a filtering unit, the combination comprising a pair of spaced parallel plates defining a passage-way therebetween through which a gas to be filtered may pass, each of said plates having a filtering screen of wave-like configuration mounted thereon to provide a plurality of screening surfaces through which a gas to be cleaned of entrained fluid may pass in its movement through said pasage-way, the screens on said plates being spaced from each other along their entire length to provide an unobstructed path in said passage-way between said screens through which the gas may by-pass any one of said screening surfaces in the event of cloggage of the screen forming said one screening surface.

3. A filtering unit as claimed in claim 2 wherein the spacing between said screens is uniform along the entire length of said passage-way, said path thereby having the same wave-like configuration as the wave-like configuration of the screens forming the path.

4. A filtering unit as claimed in claim 3 wherein the screen portions of said wave-like configurations facing in a direction opposite that in which the gas is moving are more dense than the remaining screen portions of said wave-like configurations which face in the same direction as that in which the gas is moving.

5. In a filtering unit, the combination comprising a plurality of spaced parallel members defining a plurality of parallel passage-ways through which a gas to be filtered may pass, adjacent ones of said members having confronting surfaces defining one of said passage-ways therebetween, each of said surfaces having a filtering screen of wave-like configuration mounted thereon to provide a plurality of screening surfaces through which a gas to be cleaned of entrained fluid may pass in its movement through said passage-way, the screens on said surfaces forming the passage-ways being spaced from each other along their entire length to provide an unobstructed path in said passage-way between said screens through which the gas may by-pass any one of said screening surfaces in the event of cloggage of the screen forming said one screening surface.

6. In a filtering unit, the combination comprising a pair of spaced parallel plates defining a passage-way therebetween through which a gas to be filtered may pass, a first bracket secured to one of said plates at the entry end of said passage-way and a second bracket secured to the other of said plates at the exit end of said passage-way, each of said bracket members having a supporting member parallel to but spaced a predetermined distance from a plate other than the one to which it is secured, and a pair of filtering screens respectively having a wave-like configuration and mounted on one of said plates to provide a plurality of screening surfaces through which a gas to be cleaned of entrained fluid may pass in its movement through said passage-way, each of said screens having one end connected to one of said supporting members and its other end secured directly to the surface of the plate mounting said one supporting member, said screens being spaced from each other along their entire length a distance substantially the same as said predetermined distance to provide an unobstructed path through said passage-way of the same wave-like configuration as the configuration of said screens, said path providing a by-pass through which gas may flow around any one of said screening surfaces which may have become clogged with entrained fluid separated from gas flowing therethrough.

GRANT D. BRADSHAW.

REFERENCES CITED

The following references are of record in the file of this patent:

UNITED STATES PATENTS

| Number | Name | Date |
|---|---|---|
| 297,436 | Ortman et al. | Apr. 22, 1884 |
| 718,805 | Watts | Jan. 20, 1903 |
| 1,056,108 | Lunden | Mar. 18, 1913 |
| 1,202,953 | Adams | Oct. 31, 1916 |
| 1,347,374 | Hudson | July 20, 1920 |
| 1,405,437 | Quam | Feb. 7, 1922 |

FOREIGN PATENTS

| Number | Country | Date |
|---|---|---|
| 404,495 | Great Britain | Jan. 18, 1934 |